(12) United States Patent
Redling et al.

(10) Patent No.: US 8,966,531 B2
(45) Date of Patent: *Feb. 24, 2015

(54) COMPUTER PROGRAM PRODUCT AND DEVICE FOR DISPLAYING ADVERTISING ON A TELEVISION

(75) Inventors: Peter M. Redling, New York City, NY (US); Jackie Skipper Barrios, New York, NY (US)

(73) Assignee: Your Choice Interactive, Inc., New York, NY (US)

( * ) Notice: Subject to any disclaimer, the term of this patent is extended or adjusted under 35 U.S.C. 154(b) by 761 days.

This patent is subject to a terminal disclaimer.

(21) Appl. No.: 13/118,543

(22) Filed: May 30, 2011

(65) Prior Publication Data

US 2011/0231877 A1 Sep. 22, 2011

Related U.S. Application Data

(63) Continuation of application No. 11/831,433, filed on Jul. 31, 2007, now Pat. No. 8,006,265, which is a continuation of application No. 09/584,805, filed on May 31, 2000, now Pat. No. 7,269,837.

(51) Int. Cl.
*G06F 3/00* (2006.01)
*G06Q 30/00* (2012.01)
*H04N 5/445* (2011.01)
(Continued)

(52) U.S. Cl.
CPC .. *H04N 21/4722* (2013.01); *H04N 2005/44521* (2013.01); *H04N 5/445* (2013.01); *H04N 5/44508* (2013.01); *H04N 21/858* (2013.01); *H04N 21/8583* (2013.01); *H04N 21/8586* (2013.01); *G06F 17/30014* (2013.01); *G06F 17/30876* (2013.01); *G06Q 30/02* (2013.01); *G06Q 30/0241* (2013.01); *G06Q 30/0257* (2013.01); *G06Q 30/0271* (2013.01); *G06Q 30/0273* (2013.01); *G06Q 30/0274* (2013.01); *H04H 20/38* (2013.01); *H04H 20/93* (2013.01); *H04H 60/33* (2013.01); *H04H 60/65* (2013.01);
(Continued)

(58) Field of Classification Search
CPC ............ H04N 21/858; H04N 21/8583; H04N 21/8586; H04N 2005/44521; H04N 5/445; H04N 5/44508; H04N 21/4722; G06F 17/30014; G06F 17/30876; H04H 20/93; H04H 60/33; H04H 60/66; H04H 20/38; G06Q 30/02; G06Q 30/0257; G06Q 30/0273
USPC ......... 725/42, 43, 51, 52, 60, 109; 705/14.55, 705/14.58, 14.1, 14.19; 348/563, 569
See application file for complete search history.

(56) References Cited

U.S. PATENT DOCUMENTS 5,524,195 A 6/1996 Clanton, III
5,532,735 A 7/1996 Blahut
(Continued)

*Primary Examiner* — Hoang-Vu A Nguyen-Ba
(74) *Attorney, Agent, or Firm* — Jeffrey S. Melcher; Manelli Selter PLLC

(57) ABSTRACT

A method of providing advertising from a central database server connected to a global computer network to distributed sites via interactive television. A representative icon is presented to a subscriber on a television screen indicating an advertisement. When a the icon is selected, an advertisement information detail is retrieved from storage in a local memory, or from the central database server and presented to the subscriber on the television screen.

35 Claims, 3 Drawing Sheets

(51) Int. Cl.
  *H04N 5/50* (2006.01)
  *H04N 21/4722* (2011.01)
  *H04N 21/858* (2011.01)
  *G06F 17/30* (2006.01)
  *G06Q 30/02* (2012.01)
  *H04H 20/38* (2008.01)
  *H04H 20/93* (2008.01)
  *H04H 60/33* (2008.01)
  *H04H 60/65* (2008.01)
  *H04H 60/66* (2008.01)
  *H04N 21/462* (2011.01)
  *G06F 13/00* (2006.01)
  *H04N 7/173* (2011.01)

(52) U.S. Cl.
  CPC ........... *H04H 60/66* (2013.01); *H04N 21/4622* (2013.01)
  USPC ............. 725/42; 725/43; 725/51; 725/52; 725/60; 725/109; 705/14.55; 705/14.58; 705/14.1; 705/14.19; 348/563; 348/569

(56) References Cited

U.S. PATENT DOCUMENTS

| | | |
|---|---|---|
| 5,579,057 A | 11/1996 | Banker |
| 5,583,560 A | 12/1996 | Florin |
| 5,585,858 A | 12/1996 | Harper |
| 5,673,401 A | 9/1997 | Volk |
| 5,689,562 A | 11/1997 | Hassam |
| 5,724,103 A | 3/1998 | Batchelor |
| 5,734,853 A | 3/1998 | Hendricks |
| 5,754,940 A | 5/1998 | Smith |
| 5,761,606 A | 6/1998 | Wolzien |
| 5,764,276 A | 6/1998 | Martin |
| 5,805,154 A | 9/1998 | Brown |
| 5,828,403 A | 10/1998 | DeRodeff |
| 5,903,816 A | 5/1999 | Broadwin |
| 5,915,243 A | 6/1999 | Smolen |
| 5,931,908 A | 8/1999 | Gerba |
| 5,949,476 A | 9/1999 | Pocock |
| 5,953,046 A | 9/1999 | Pocock |
| 6,002,394 A | 12/1999 | Schein |
| 6,005,602 A | 12/1999 | Matthews, III |
| 6,005,606 A | 12/1999 | Nakano |
| 6,006,257 A | 12/1999 | Slezak |
| 6,078,896 A | 6/2000 | Kaehler |
| 6,177,931 B1 | 1/2001 | Alexander |
| 6,191,782 B1 * | 2/2001 | Mori et al. ........... 725/37 |
| 6,282,713 B1 | 8/2001 | Kitsukawa |
| 6,396,473 B1 | 5/2002 | Callahan |
| 6,505,169 B1 | 1/2003 | Bhagavath |
| 6,760,916 B2 | 7/2004 | Holtz |
| 6,766,526 B1 | 7/2004 | Ellis |
| 7,032,176 B2 | 4/2006 | Gordon |
| 7,058,376 B2 | 6/2006 | Logan |
| 7,103,904 B1 | 9/2006 | Blackketter |
| 2001/0001160 A1 | 5/2001 | Shoff |
| 2001/0036865 A1 | 11/2001 | Neal |
| 2002/0066097 A1 | 5/2002 | Hattori |
| 2002/0124255 A1* | 9/2002 | Reichardt et al. ........... 725/42 |
| 2003/0163823 A1 | 8/2003 | Logan |
| 2003/0188309 A1 | 10/2003 | Yuen |
| 2003/0208758 A1 | 11/2003 | Schein |
| 2004/0117831 A1 | 6/2004 | Ellis |
| 2005/0015796 A1 | 1/2005 | Bruckner |
| 2009/0019485 A1 | 1/2009 | Ellis |

* cited by examiner

COMPUTER PROGRAM PRODUCT AND DEVICE FOR DISPLAYING ADVERTISING ON A TELEVISION

CROSS REFERENCE TO RELATED APPLICATIONS

This application claims priority to, and is a continuation of, U.S. application Ser. No. 11/831,433, filed Jul. 31, 2007 now U.S. Pat. No. 8,006,265, which is a continuation of U.S. application Ser. No. 09/584,805, filed May 31, 2000, issued as U.S. Pat. No. 7,269,837, which are all incorporated herein by reference in their entirety for all purposes.

FIELD AND BACKGROUND OF THE INVENTION

The present invention relates generally to the field of interactive television and in particular to a new and useful way to provide selective advertising to a television viewer using an interactive display.

Interactive television systems including advertising are generally known in the art. For example, an interactive television system which queries a viewer about their advertising preferences and then presents targeted advertisements is taught by U.S. Pat. No. 6,006,257. A viewer can select from the option of receiving no advertising and pay a fee to watch a program, some advertising and a reduced fee, or interactive advertising and watch the program for free. The interactive advertising requires responses from the viewer, and the advertising can be changed depending on the responses given by the viewer. A set-top communications box having a cable modem connection is used to connect the television to the program provider and advertiser on the Internet.

U.S. Pat. No. 5,761,606 is for an interactive system which provides indicators to a viewer through the vertical blanking intervals (VBI) of a conventional program. The indicator can be a message on the television screen, a blinking light or a sound, among other things. The indicators provide a notice to viewers that more information about the program is available, sometimes through links to Internet or other on-line information providers. If the link is selected, the system connects to the on-line information provider via a digital connection using address information in the indicator link. The information may be displayed on a television using picture-in-picture format.

U.S. Pat. No. 5,585,858 teaches a system for simulcasting an interactive program with a normal television program using the same video signal bandwidth. Graphical questions can be presented to the viewer at the beginning or during the program. A response is made using a keyboard or keypad. The system generates a reply based on the user response. Users can have either a set-top communications box or a personal computer attached to the television to connect interactive components. The system is particularly adapted to educational uses.

U.S. Pat. No. 5,724,103 discloses an interactive information delivery system using the vertical blanking intervals (VBI) of certain television stations to provide data sent with the conventional programming on a computer monitor. A computer having the necessary decoding hardware can display both the data and the conventional program on the monitor. The data is encoded into the VBI by the television station broadcaster prior to transmission of the conventional program. The patent does not teach displaying the data and conventional program on a television.

U.S. Pat. No. 5,931,908 describes an overlay system for an interactive television program in which overlay items seen on the screen can be selected to activate information retrieval from the Internet. As an example, if an overlay of an actor's name shown in the credits is selected, information about the actor is retrieved from the Internet and displayed to the viewer. Overlays are associated with a particular program so that the available selection options are relevant to the program.

Patents which disclose cable devices for displaying information on a television, include U.S. Pat. No. 5,579,057 for an on-screen display system for a subscriber terminal of a subscription television system. A screen containing a reduced size graphics area (television signal) bordered by a text display is described in columns 10 and 11. The graphics area can be overlapped by the text mode. The patent relates to addressable television cable converter boxes which can use either the cable connection or a telephone connection to order pay-per-view events and other programming. The patent does not teach receiving a signal from the Internet; the television signals are all received from a cable provider via the cable, or the display information comes from graphics stored in a memory in the converter box.

U.S. Pat. No. 5,524,195 discloses a graphical interface for an on-demand video system having a television, a set-top communications box and a video server. The available user selections are presented as a graphic scene on the television for selection by a user. A CPU in the set-top box generates the graphic scene and interprets user commands. Advertisements are identified as being one of the possible selections presented on the television screen. However, the graphic scene occupies the entire screen, there is no connection to the Internet and television signal programming cannot be viewed concurrently with the graphic scene.

A method of providing directed advertising via a consumer's television is taught by U.S. Pat. No. 5,915,243. First, the consumer is asked a series of questions to determine what advertising is appropriate for the consumer. Then, based on the profile, different promotions and coupons are offered to the consumer through the television. A set-top communications box is connected to the television which is both a signal tuner and transmitter using the cable television lines.

SUMMARY OF THE INVENTION

It is an object of the present invention to provide an interactive television advertising method using a set top box to deliver internet-based advertisements.

It is a further object of the invention to provide advertising to a consumer which can be selected to obtain more detailed information about an advertised product or service.

Accordingly, an advertising method provides a way of marketing products and services from an Internet-based computer server on a television set equipped with a communications box connecting the television to the Internet.

A semi-transparent icon is displayed on the television screen by the communications box, preferably in the lower left corner, over the programming from the currently selected channel. The icon periodically changes to resemble different product trademarks or company names. The icon is a link to an advertisement or other product information for the trademark or name. The advertisement can be stored on the communications box in a cache memory or on a disk. Alternatively, the box can be used to retrieve advertising from an Internet server computer when the icon is selected.

The box may receive Internet signals over telephone lines, or, in an alternate embodiment, the Internet signal can be transmitted in the sidebands of television channels, such as PBS. The box may adjust the television signal to display the advertisement from the Internet source as a border around the resized television signal, similar to sports tickers and stock tickers used on television stations like ESPN, CNN, CNBC, among others.

Thus, the method comprises providing a communications box for storing and displaying advertising and interpreting user commands, connecting the box to a television set and to the Internet, and using the box to display an icon on the television screen. The icon is a semi-transparent link superimposed over the television signal programming, that, when selected by sending a user command to the box, causes advertising stored in the box to be displayed on the television. The communications box is updated via the Internet connection, either by the box requesting updates, or an Internet server sending the updates to the box automatically.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

The method of the invention delivers advertising from an Internet-based server to multiple subscribers at different, distributed locations through a conventional television using a set top box.

Figure 1:
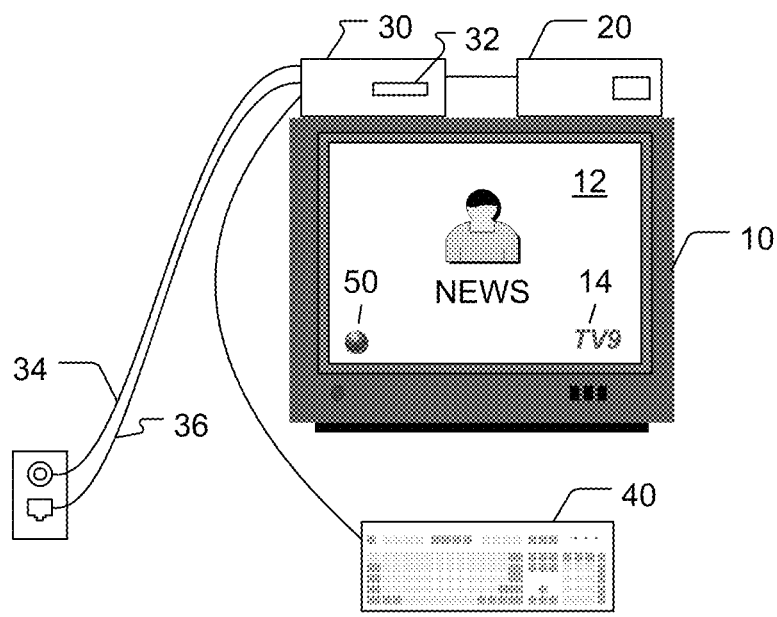
FIG. 1 is a drawing showing the interconnection of components at a subscriber's location.

Referring to the drawings, in which like reference numerals are used to refer to the same or similar elements, FIG. 1 shows the equipment used to practice the method at a subscriber's location. A television set 10 is connected to a cable box 20 channel selector and to a set top controller or communications box 30 by standard coaxial cables or other known connections. The set top communications box 30 has a cable connection 34 to the cable TV provider company and a phone connection 36 to the local telephone company. A keyboard 40 or other input device is connected to the set top communications box 30.

Some televisions do not require a cable box 20, and so this component may not be present in some installations.

The set top communications box 30 includes a CPU for controlling and processing instructions, a memory and a modem. The memory is used for both long term storage and short term CPU operations, and may include RAM and ROM memory and storage devices such as a magnetic or optical drive. The modem may be a telephone modem or a cable modem. When a cable modem is used, the phone connection 36 is not needed. Signals may be received using the cable connection 34, such as through the vertical blanking index (VBI) portion of channels or other sideband frequencies on stations like PBS. The CPU receives instructions from the keyboard 40 and produces a TV-compatible output to the cable box 20 for display on the television 10.

Television 10 has a screen 12 which displays an image depending on the channel selected using the cable box 20. Recently, many broadcast and cable television stations have begun displaying a semi-transparent logo 14 identifying the station being watched in the lower right corner of the image presented on the screen 12. The logos 14 typically appear as a white logo with the background determined by the image being displayed, so that the full television image is still displayed.

An advertising icon 50 generated by the set top box 30 is presented to the subscriber in the lower left corner of the screen 12. The advertising icon 50 indicates an interactive link which can be selected by the subscriber using the input device 40 to retrieve advertising information, as described below.

Figure 2:
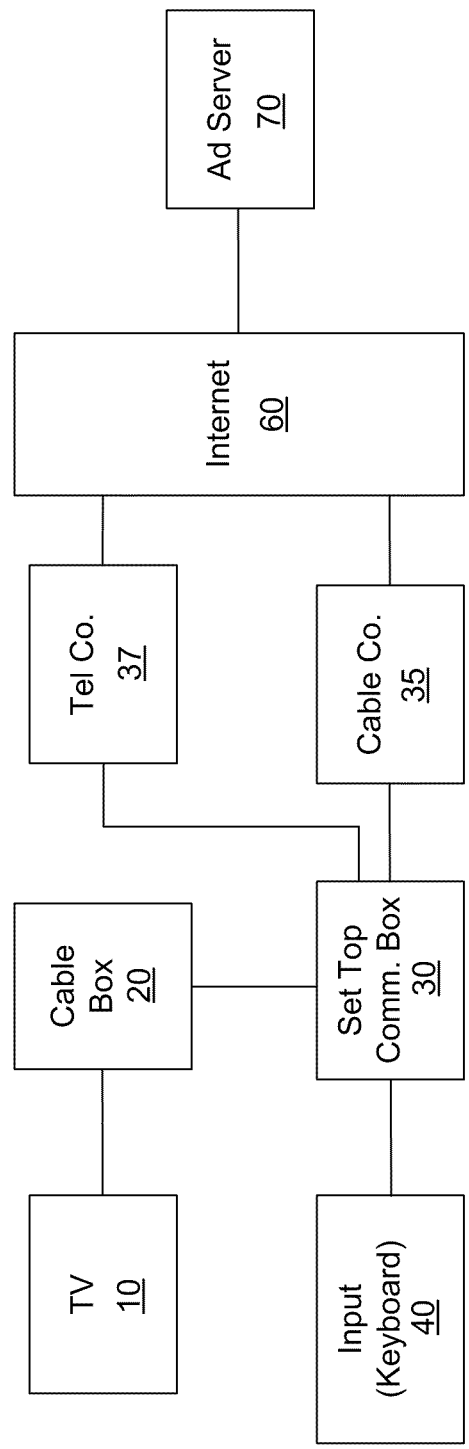
FIG. 2 is a schematic drawing showing the interconnection of the components of a system used to practice the invention.

The subscriber's equipment is connected to a central advertising server 70 through the Internet 60 as shown in FIG. 2. The set top communications box 30 uses either a dial-up or other phone line connection through the local telephone company 37, or where available, a cable modem connection through the local cable provider 35 to connect to the Internet 60. As used herein, the term Internet is intended to encompass any large grouping of distributed computers which can share data, as is presently known, or as may be done in the future under a different name.

Figure 3:
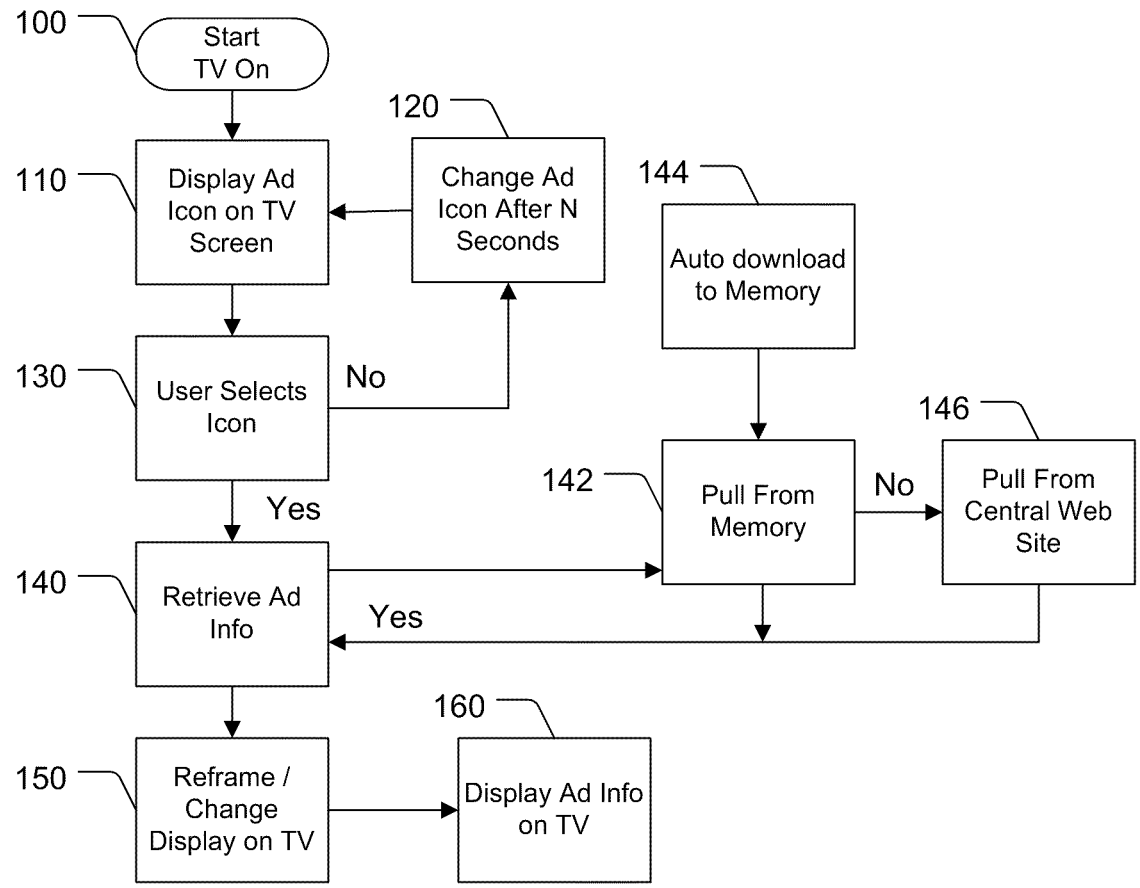
FIG. 3 is a flowchart showing the steps of the invention.

The method for providing advertising to multiple subscribers shown in the flowchart of FIG. 3 may be practiced using the equipment described above.

As seen in FIG. 3, with reference to FIGS. 1 and 2, first the television is turned on 100. The set top communications box 30 begins displaying semi-transparent icons 50 one at a time on the television screen. The icons 50 are preferably recognizable logos or trademarks of advertisers. The icons 50 each represent the availability of an advertisement or advertiser information. Following an icon 50 being displayed, the set top box 30 waits for an input from the subscriber through the input device 40. The input is whether the subscriber using the television has selected the icon or not 130 using the input device 40. If no input is detected after a fixed period, the icon 50 is changed 120 to a different icon and the new icon is displayed 110 on the TV screen 12. In a preferred embodiment, the icon 50 changes about every 2 minutes, or 120 seconds.

If an icon 50 is selected by a subscriber, then advertising information is retrieved 140 and displayed 150, 160 on the TV screen 12. The set top box 30 contains link information for each icon, matching the displayed icon 50 to related advertising information. The advertising information may be stored in a local memory device of the set top box 30 and retrieved on request 142. Alternatively, the advertising information may be requested and retrieved 146 from the central advertising server 70.

In order to maintain a current selection of advertisements in the memory of the set top box 30, advertising information and associated display icons 50 may be automatically downloaded 144 to the set top box 30 memory devices on a regular basis. For example, the information can be downloaded 144 during the early morning of each day, or once per week or less frequently, depending on the nature of the advertising. The automatic download 144 can occur in a number of different ways, including by having the set top box 30 assigned an Internet address to which the central advertising server 70 transmits when the box 30 has a permanent connection, or by having the set top box 30 make the connection to the server 70, followed by the server downloading 144 the advertising information after it detects the connection.

In a further embodiment, the icons may be transmitted to and stored in the set top communications box 30 separately from the associated advertising information. In such case, the icons are displayed on the screen, and when an icon is selected, the associated advertising information is requested from the central advertising server 70 and transmitted to the set top box 30 for displaying on the television screen 150, 160.

Once the set top box 30 has the advertising information retrieved, the display on the TV can either be changed or reframed 150 to fit the format of the advertising information. If the display will be reframed, the displayed program can be reduced in size and framed in the upper portion of the screen, while the lower portion of the screen is used to display the advertising information 160. Or, the entire TV screen can be used to display the advertising information 160 in place of the regular programming.

Using the method of the invention, a subscriber can view advertising which he/she would like to see on a selective basis. If particular information is known about the subscriber, such as when the set top box 30 is installed in a resort hotel, targeted advertisements can be provided. For example, at a resort in Florida, icons and advertisements for local restaurants and entertainment facilities may dominate the advertising. At a hotel in New York, the advertisements may focus on Broadway shows, restaurants and transportation services.

The method is particularly well suited for providing targeted advertising to persons staying in hotels, resorts and other rental properties, where the owner of the property subscribes to the advertising method and installs the set top communications boxes 30. The tenants using the TV's in the rooms then receive the advertising. Discounts can be provided to the tenants who view the advertising, in the form of increased savings at the advertiser's business, or a discount off their rental rate for each advertisement viewed.

While a specific embodiment of the invention has been shown and described in detail to illustrate the application of the principles of the invention, it will be understood that the invention may be embodied otherwise without departing from such principles.

What is claimed is:

1. A computer program product stored in a non-transitory tangible computer readable medium and executable by a computing device, comprising:
   a code segment executable to receive a plurality of advertising icons;
   wherein each of the plurality of advertising icons is representative of a company or product;
   a code segment executable to receive one or more advertisements and wherein each of the one or more advertisements is associated with at least one of the plurality of advertising icons;
   a code segment executable to cause one or more of the plurality of advertising icons to be displayed overlaying video content and wherein the displayed advertising icon is not integrated with an electronic program guide;
   a code segment executable to receive a user input indicating that a displayed advertising icon has been selected; and
   a code segment executable to display an advertisement associated with the selected advertising icon in response to receiving the user input.

2. The computer program product of claim 1, wherein said code segment executable to display an advertisement associated with the selected advertising icon is executable to display the advertisement by resizing the video content and to display the advertisement in a distinct frame on the display.

3. The computer program product of claim 1, wherein the advertisement displayed is targeted based on location information of the user.

4. The computer program product of claim 1, wherein said code segment executable to display an advertisement associated with the selected advertising icon is executable to display the advertisement in place of the video content.

5. The computer program product of claim 1, further comprising a code segment executable to transmit a request for one or more advertisements in response to receipt of the user input.

6. The computer program product of claim 1, further comprising a code segment executable to retrieve the associated advertisement from a local memory in response to receipt of the user input.

7. The computer program product of claim 1, wherein said code segment executable to cause one or more of the plurality of advertising icons to be displayed is executable to display the one or more of the plurality of advertising icons by superimposing each of the advertising icons as a semi-transparent icon over the video content.

8. The computer program product of claim 7, wherein said code segment executable to cause one or more of the plurality of advertising icons to be displayed is executable to cause one or more of the plurality of advertising icons to be sequentially displayed so that only one advertising icon is visible at a time.

9. The computer program product of claim 1, wherein said code segment executable to cause one or more of the plurality of advertising icons to be displayed is executable to cause one or more of the plurality of advertising icons to be sequentially displayed so that only one advertising icon is visible at a time.

10. The computer program product of claim 1, further comprising a code segment executable to initiate a financial incentive to a user for viewing an advertisement.

11. The computer program product of claim 10, wherein the financial incentive comprises a reduction in a price for an item of commerce for which the user agreed to pay prior to viewing the advertisement; and
   wherein the item of commerce is not advertised in the advertisement.

12. The computer program product of claim 1, wherein the video content comprises television programming.

13. A computer program product stored in a non-transitory tangible computer readable medium and executable by a computing device to provide advertisements to a plurality of communication devices disposed at a plurality of locations and configured to receive a user input indicating that a displayed advertising icon has been selected and, in response, to cause an associated advertisement to be displayed, comprising:
   a code segment executable to transmit a plurality of advertising icons to each of the plurality of communication devices;
   wherein each of the plurality of advertising icons is representative of a company or product;
   a code segment executable to transmit one or more advertisements to each of the plurality of communication devices and wherein each advertising icon has at least one associated advertisement; and
   wherein the advertising icons are configured to be displayed overlaying video content and not integrated with an electronic program guide.

14. The computer program product of claim 13, wherein at least some of the one or more advertisements are configured to be displayed in place of the video content being displayed.

15. The computer program product of claim 13, further comprising a code segment executable to respond to a request for one or more advertisements from a communication device.

16. The computer program product of claim 15, wherein said code segment executable to transmit one or more advertisements is executable to transmit the one or more advertisements in response to receipt of request for one or more advertisements.

17. The computer program product of claim 13, wherein said code segment executable to transmit one or more advertisements is executable to transmit the one or more advertisements without receipt of a request for one or more advertisements.

18. The computer program product of claim 13, wherein the plurality of advertising icons are configured to be superimposed as a semi-transparent icon over the video content.

19. The computer program product of claim 13, wherein the advertising icons are configured to be displayed sequentially so that only one advertising icon is visible at any given time.

20. The computer program product of claim 13, wherein the video content and the one or more advertisements are communicated to at least some of the locations via a same communication medium.

21. The computer program product of claim 13, wherein the video content and the one or more advertisements are communicated to at least some of the locations via different communication mediums.

22. The computer program product of claim 13, wherein at least some of the one or more advertisements are targeted based on user information.

23. The computer program product of claim 13, wherein at least some of the one or more advertisements are targeted based on the location of the communication device.

24. The computer program product of claim 13, further comprising a code segment executable to initiate a financial incentive to a user for viewing an advertisement.

25. The computer program product of claim 24, wherein the financial incentive comprises a reduction in a price for an item of commerce for which the user agreed to pay prior to viewing the advertisement; and
wherein the item of commerce is not advertised in the advertisement.

26. A communication device, comprising:
a user interface operable to receive a user input;
a memory;
a first port configured to communicate;
a processor in communication with said memory and said first port and configured to receive communications from said user interface; and
wherein said processor is configured to:
receive one or more advertising icons via said first port;
wherein at least some of the one or more advertising icons are representative of a company or product;
receive one or more advertisements via said first port;
wherein each of the one or more advertisements is associated with at least one of the one or more advertising icons;
display the one or more advertising icons overlaying video content and wherein the displayed advertising icon is not integrated with an electronic program guide;
receive via the user interface a user selection of a displayed icon; and
in response to receipt of the user selection, display one of the one or more advertisements that is associated with the selected advertising icon.

27. The device of claim 26, wherein said processor is configured to initiate a financial incentive to an account of a user for display of the advertisement.

28. The device of claim 26, wherein the financial incentive comprises a reduction in a price for an item of commerce for which the user agreed to pay prior to viewing the advertisement; and
wherein the item of commerce is not advertised in the advertisement.

29. The device of claim 26, wherein said first port is further configured to receive the video content.

30. The device of claim 26, wherein the video content comprises television programming.

31. The device of claim 26, further comprising a second port in communication with said processor and configured to receive the video content.

32. The device of claim 26, wherein the advertisement displayed is targeted based on information of the user.

33. The device of claim 26, wherein the advertisement displayed is targeted based on location information of the user.

34. The device of claim 26, wherein in response to receipt of said user selection, said processor is configured to transmit a request for an associated advertisement via said first port.

35. The device of claim 26, wherein said processor is configured to sequentially display each of the one or more advertising icons so that only one advertising icon is displayed at any given time.

* * * * *